(12) United States Patent
Bushway

(10) Patent No.: US 12,020,103 B2
(45) Date of Patent: Jun. 25, 2024

(54) RFID-ENABLED WATCH BAND

(71) Applicant: TREX ADAPTATIONS LLC, Ft. Lauderdale, FL (US)

(72) Inventor: Tobias J. Bushway, Ft. Lauderdale, FL (US)

(73) Assignee: TREX ADAPTATIONS LLC, Ft. Lauderdale, FL (US)

( * ) Notice: Subject to any disclaimer, the term of this patent is extended or adjusted under 35 U.S.C. 154(b) by 0 days.

(21) Appl. No.: 18/099,335

(22) Filed: Jan. 20, 2023

(65) Prior Publication Data

US 2023/0237304 A1 Jul. 27, 2023

Related U.S. Application Data

(60) Provisional application No. 63/301,734, filed on Jan. 21, 2022.

(51) Int. Cl.
*G06K 19/077* (2006.01)

(52) U.S. Cl.
CPC .............................. *G06K 19/07762* (2013.01)

(58) Field of Classification Search
CPC ................................................ G06K 19/07762
See application file for complete search history.

(56) References Cited

U.S. PATENT DOCUMENTS

| | | | |
|---|---|---|---|
| 2015/0109107 A1* | 4/2015 | Gomez | G06K 19/045 340/10.1 |
| 2018/0365548 A1* | 12/2018 | Karani | G09F 3/005 |
| 2019/0341677 A1* | 11/2019 | Hsu | A44C 5/0007 |
| 2020/0012912 A1* | 1/2020 | Klimt | G06K 19/0723 |

* cited by examiner

*Primary Examiner* — Laura A Gudorf
(74) *Attorney, Agent, or Firm* — Thomas Horstemeyer, LLP

(57) ABSTRACT

Disclosed are various embodiments of a radio-frequency identification (RFID) watch band. At least one embodiment can include strap body; a connector attached to an end of the strap body; and an RFID chip embedded into the strap body. In at least some embodiments, a plurality of RFID chips can be embedded into the strap body. In some embodiments, the RFID chips can be encased within a rigid casing, which is embedded within the strap body. In some embodiments, the spacing between each of the plurality of RFID chips can be important for the RFID reader to capture the correct frequency.

20 Claims, 7 Drawing Sheets

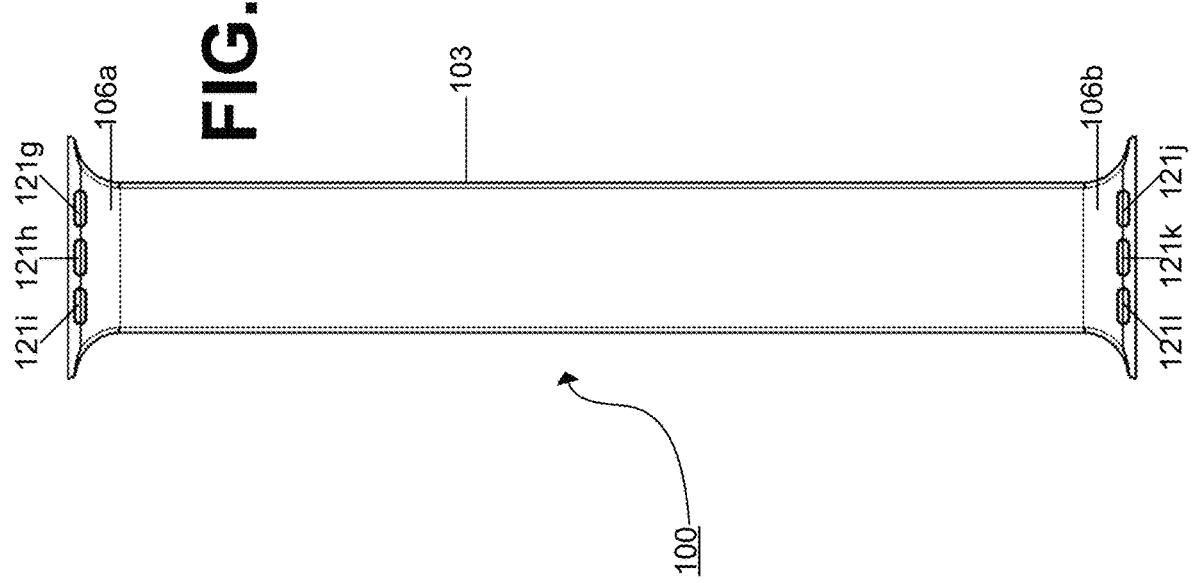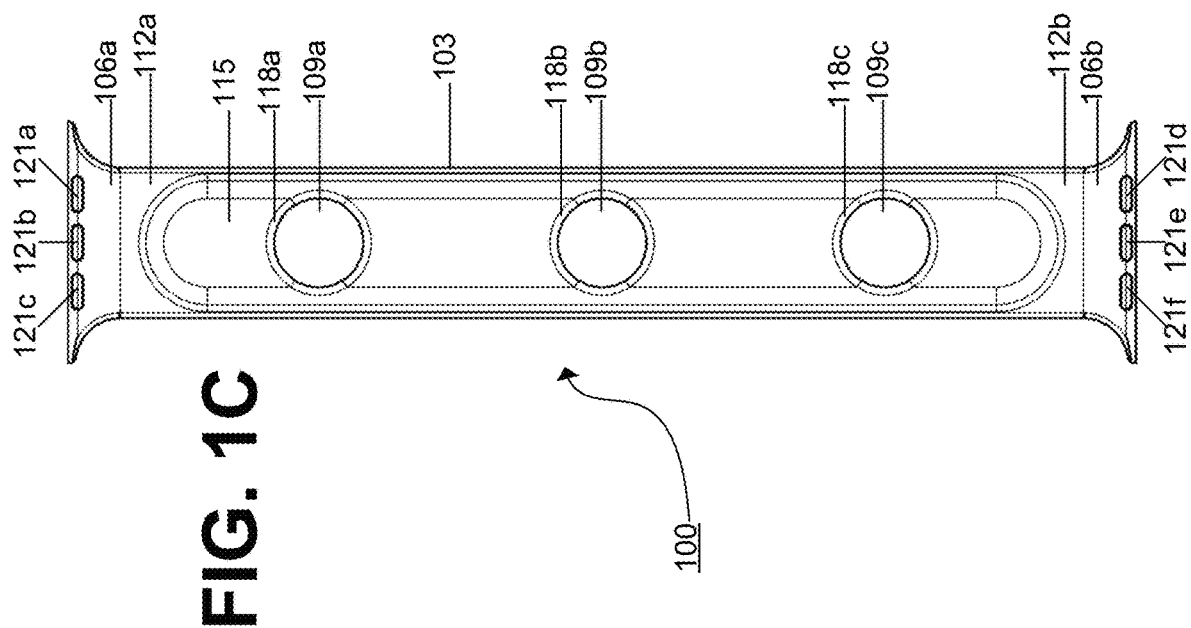

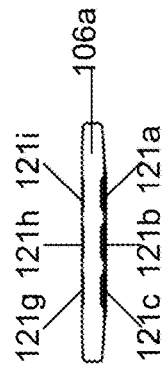
FIG. 1G
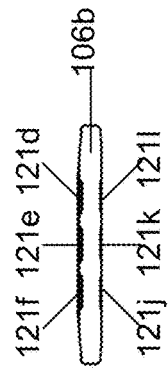
FIG. 1H
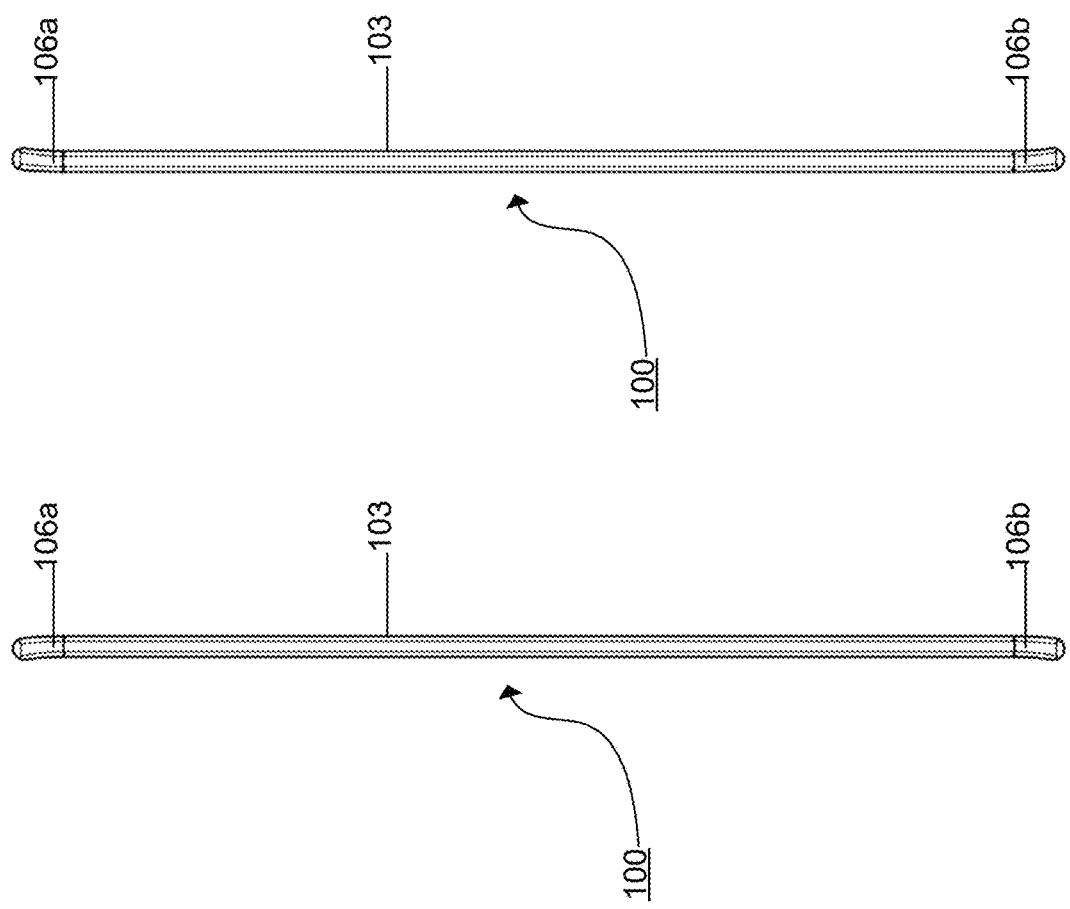
FIG. 1E
FIG. 1F

RFID-ENABLED WATCH BAND

CROSS-REFERENCE TO RELATED APPLICATION

This application claims the benefit of and priority to U.S. Provisional Patent Application No. 63/301,734 filed on Jan. 21, 2022, entitled "RFID-ENABLED WATCH BAND," the contents of which are incorporated by reference in their entirety herein.

BACKGROUND

Radio-frequency identification (RFID) technology revolutionized how humans interact with the world. Most notably, RFID has replaced the need for carrying keys, swiping at a point-of-sale terminal, and carrying contact information (identification cards/passports).

With the rise in popularity of smart watches, detachable watch bands have also risen in popularity. Detachable watch bands are often an accessory to personalize the look of their watch or smart watch.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1C depicts a first side view of an RFID-enabled watch band according to various embodiments of the present disclosure.

FIG. 1D depicts a second side view of an RFID-enabled watch band according to various embodiments of the present disclosure.

FIG. 1E depicts a medial right view of an RFID-enabled watch band, wherein the left side is the first side of the RFID-enabled watch band, according to various embodiments of the present disclosure.

FIG. 1F depicts a medial left view of an RFID-enabled watch band, wherein the right side is the first side of the RFID-enabled watch band, according to various embodiments of the present disclosure.

FIG. 1G depicts a lateral top view of an RFID-enabled watch band, wherein the top is the first side of the RFID-enabled watch band, according to various embodiments of the present disclosure.

FIG. 1H depicts a lateral bottom view of an RFID-enabled watch band, wherein the top is the second side of the RFID-enabled watch band, according to various embodiments of the present disclosure.

DETAILED DESCRIPTION

Disclosed are various embodiments for RFID-enabled watch bands. Radio-frequency identification (RFID) is a technology that uses electromagnetic fields to identify information about an attached item or good. Because of its broad uses in various technologies, RFID technology has changed how humans interact with various items in the real world. For example, RFID has replaced the need for carrying keys, swiping a card at a point-of-sale terminal, and sharing personal identification information manually. People often carry RFID cards or RFID chips (e.g., credit cards, entrance cards, identification cards, etc.) in wallets and purses. However, carrying multiple RFID cards in wallets and purses can cause various problems. Problems can include wasting valuable time searching for an RFID card and identifying which RFID card corresponds to a particular usage.

Watch bands are wearable accessories that can be used to attach a watch to a human body, typically on a wrist. Watch bands can come in various lengths, colors, and materials as an accessory for their outfits. Due to the popularity of smart watches, detachable watch bands have also become more popular. Detachable watch bands typically utilize a connector that can be detachably detached from a watch or a smart watch so that the detachable watch band can be changed like any other accessory of clothing.

The present disclosure relates to an RFID-enabled watch band. An RFID-enabled watch band permits its wearer to have a specified RFID chip available without having to fumble through various cards in purses or wallets, which can save time for the wearer. Additionally, the wearer can easily access the RFID chips even if they are using their hands for other tasks, such as carrying groceries, talking on the phone, or other various tasks that utilize a wearer's hands.

Figure 1A:
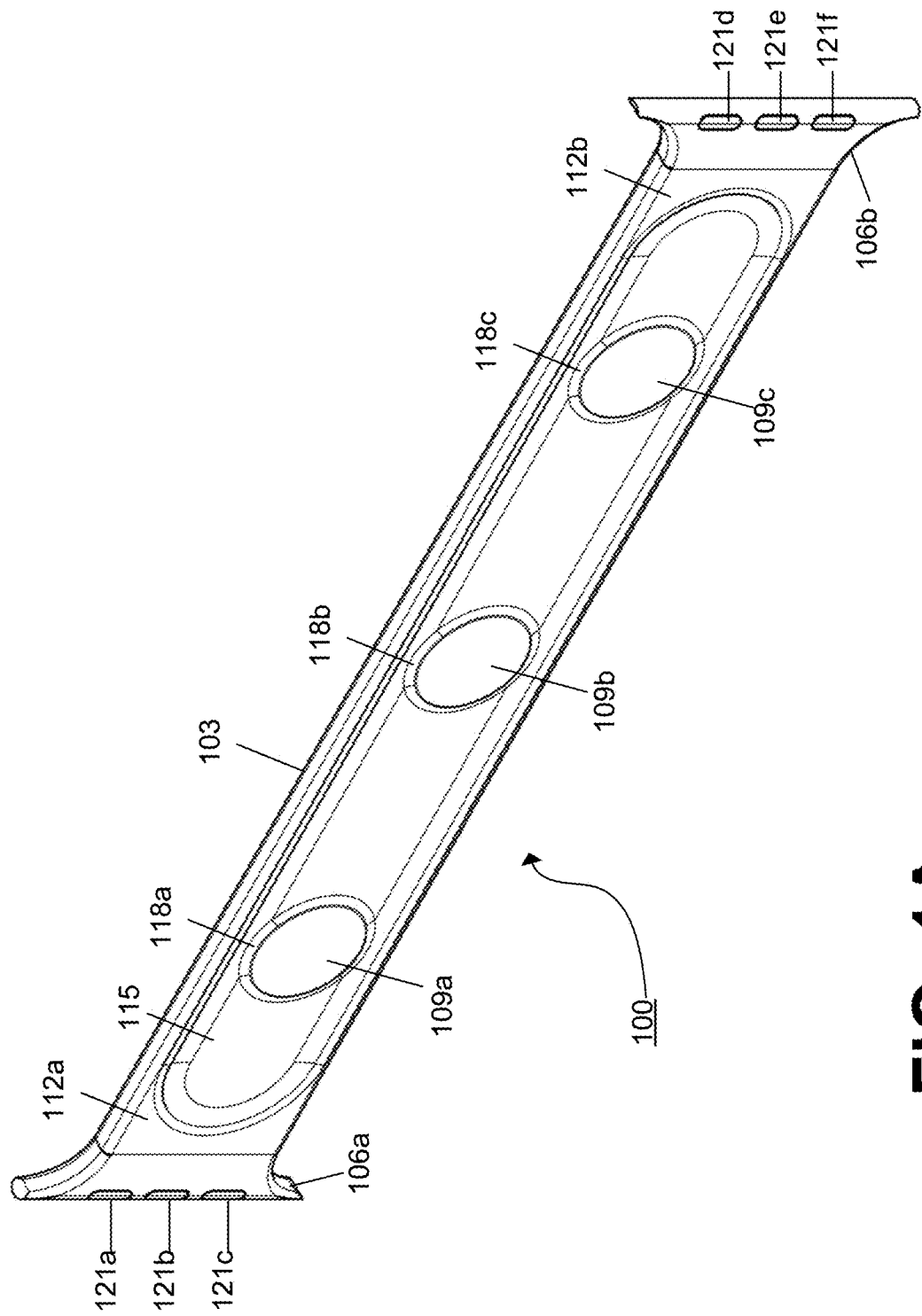
FIG. 1A depicts a perspective view for the first side of an RFID-enabled watch band according to various embodiments of the present disclosure.

With reference to FIG. 1A, shown is a perspective view for the first side of an RFID-enabled watch band 100. The RFID-enabled watch band 100 can include a band 103, watch connectors 106a and 106b (also referred to collectively as "the watch connectors 106" and generically as "a watch connector 106"), and RFID chips 109a-c (also referred to collectively as "the RFID chips 109" and generically as "an RFID chip 109"). The band 103 can be attached to the watch connectors 106 in various ways (e.g., glued, welded, attached with pin and hole connectors or screws, molded, etc.). The RFID chips 109a-c can be embedded or inset within the band 103.

The band 103 can be an elongated strap of a sufficient length to wrap around the wrist of a human. The band 103 can have various lengths, widths, and thicknesses. In many embodiments, the band 103 can be longer than it is wide. In many embodiments, the band 103 can be thinner than it is wide. In at least some embodiments, the band 103 can be flexible, elastic, or pliable. In other embodiments, the band 103 can be rigid, stiff, or inflexible. The band 103 can be made of various materials, such as animal leather; faux leather; rubber (e.g., silicone rubber, polyurethane rubber, polyvinyl chloride (PVC) rubber, Nitrile Butadiene Rubber, etc.); plastics; fabric (e.g., nylon, canvas, silk, etc.); metal; other synthetic material (e.g., Kevlar, carbon fiber, etc.); or any combination thereof.

The band 103 can include various portions of the band 103 that have various characteristics, such as ends 112a and 112b (also referred to collectively as "the ends 112" and generically as "an end 112"), an indent 115, and raised encasings 118a-c (also referred to collectively as "the raised encasings 118" and generically as "a raised encasing 118"). Various embodiments may include or exclude each of these various characteristics of the band 103.

Various embodiments of the band 103 can include the ends 112. As shown in FIG. 1A, the band 103 can have a first end 112a and a second end 112b. Even though FIG. 1A depicts two ends 112, various embodiments of the band 103 can have zero or more ends 112. The ends 112 can be found on the first side of the band 103. In many embodiments, the band 103 can have its greatest thickness at the ends 112 to ensure the band 103 can securely attach to the watch connectors 106. As such, the ends 112 can be more rigid, stiff, inelastic, or inflexible than other portions of the band 103. In other embodiments, the band 103 can have the same or lesser thickness at the ends 112 as compared to the rest of the band 103 to allow the ends 112 to bend freely.

Some embodiments of the band 103 can include an indent 115. In some of these embodiments, the indent 115 can be found throughout a substantial portion of the first side of the band 103 stretching from the first end 112a to the second end 112b. In many embodiments, the band 103 can have a lesser thickness in the indent 115 as compared to the rest of the band 103. The lesser thickness of the indent 115 can allow the band 103 to become more flexible. In some embodiments, the indent 115 can protrude into the ends 112 in an arch shape. This arch shape can allow the ends 112 to maintain a certain level of rigidity, while further expanding the flexibility within the indent 115. The edges between the indent 115 and the band 103 can be beveled, rounded, or sloped to ensure a comfortable fit for the wearer.

Some embodiments of the band 103 can include raised encasings 118. As shown in FIG. 1A, there can be a first raised encasing 118a, a second raised encasing 118b, and a third raised encasing 118c. Even though FIG. 1A depicts three raised encasings 118, various embodiments of the band 103 can have as many raised encasings 118 as there are RFID chips 109 (e.g., RFID chips 109a, 109b, and 109c), or none at all. The raised encasings 118 can surround the RFID chips 109 on the first side of the band 103. In some embodiments, the raised encasings 118 surround only the sides of the RFID chips 109, while leaving a face of the RFID chips 109 exposed. In other embodiments, the raised encasings 118 completely cover the faces and sides of the RFID chips 109, so that the RFID chips 109 are not exposed. The raised encasings 118 can provide padding to help protect the RFID chips 109 from being damaged from regular wear by a wearer. In some embodiments, the raised encasings 118 can be raised from the indent 115. In such embodiments, the raised encasings 118 can better secure the RFID chips 109 within the watch band due to the increased surface area of the band 103 touching the RFID chips 109.

The band 103 can be attached to the watch connectors 106. As shown in FIG. 1A, there can be two watch connectors 106, a first watch connector 106a and a second watch connector 106b. Even though FIG. 1A depicts two watch connectors 106, various embodiments of the RFID-enabled watch band 100 can have one or more watch connectors 106. The watch connectors 106 can be used to connect the RFID-enabled watch band 100 to a watch or smart watch. In some embodiments, the watch connectors 106 can be Apple® Watch connectors that are configured to fit within a specified version of an Apple® Watch. In other embodiments, the watch connectors 106 can be Samsung® Galaxy® Watch connectors that are configured to fit within a specified version of a Samsung® Galaxy® Watch. In yet another embodiment, the watch connectors 106 can be a watch band link using that is configured to use cotter pins to attach to a watch or smart watch.

The watch connectors 106 can include one or more locking elements 121a-l (also referred to collectively as "the locking elements 121" and generically as "a locking element 121"), as collectively shown in FIGS. 1A, 1B, 1G, and 1H. It should be understood that various embodiments of the watch connectors 106 can have one or more locking elements 121, or none at all. The locking elements 121 can allow the connector to make a secure attachment to a watch or a smart watch. In some embodiments, the locking elements 121 can be depressible, raised bodies that corresponds to holes within a watch or a smart watch. In other embodiments, the locking elements 121 can be clasps that attach to a watch or a smart watch. In yet another embodiment, the locking elements 121 can be one or more cotter pins that attach to cotter pin holes in a watch or a smart watch.

The RFID-enabled watch band 100 can include RFID chips 109. As shown in FIG. 1A, the RFID-enabled watch band 100 can have a first RFID chip 109a, a second RFID chip 109b, and a third RFID chip 109c. Even though FIG. 1A depicts three RFID chips 109, various embodiments of the RFID-enabled watch band 100 can have one or more RFID chips 109. Even though FIG. 1A depicts the RFID chips 109 as cylindrical bodies, it should be understood that the RFID chips 109 can be any shape (e.g., cube, cone, sphere, torus, pyramid, tetrahedron, three-dimensional prism, etc.) or size.

The RFID chips 109 can be embedded or inset within the band 103 in various ways (e.g., glued, welded, attached with pin and hole connectors or screws, molded, etc.). In embodiments where the RFID chips 109 are embedded in the band 103, the band 103 can fully encase the RFID chips 109 within the band 103. In such embodiments, the material of the band 103 can protect the RFID chips 109 from liquid, wind, or fire damage. In embodiments where the RFID chips 109 are inset within the band 103, the RFID chips 109 can be partially exposed.

Additionally, the location of the one or more RFID chips 109 on the band 103 can impact how the comfortably the watch can be worn. In some embodiments, the RFID chips 109 can be rigid. When rigid RFID chips 109 are embedded or inset in the band 103, the band cannot bend or flex in such a manner to be worn on a human wrist. To solve these problems, spacing can be added between at least two of the RFID chips 109. In at least some embodiments, there is at least a quarter inch space between at least two of the RFID chips 109. In some embodiments, there is at least one millimeter space between at least two of the RFID chips 109.

In at least some embodiments, the RFID chips 109 can be removable and/or replaceable from the band 103. In embodiments where the RFID chips 109 are removeable and/or replaceable from the band 103, the wearer can easily interchange their RFID chips 109 with other RFID chips 109. For example, during the work week, a wearer could want to have the first RFID chip 109a configured to provide access to the wearer's work building. However, on the weekend, the wearer could want to replace the first RFID chip 109a with a different RFID chip 109 that permits access to a gym. As such, the wearer can remove the first RFID chip 109a from the band 103 and replace it with the RFID chip 109 that permits access to the gym.

Figure 1B:
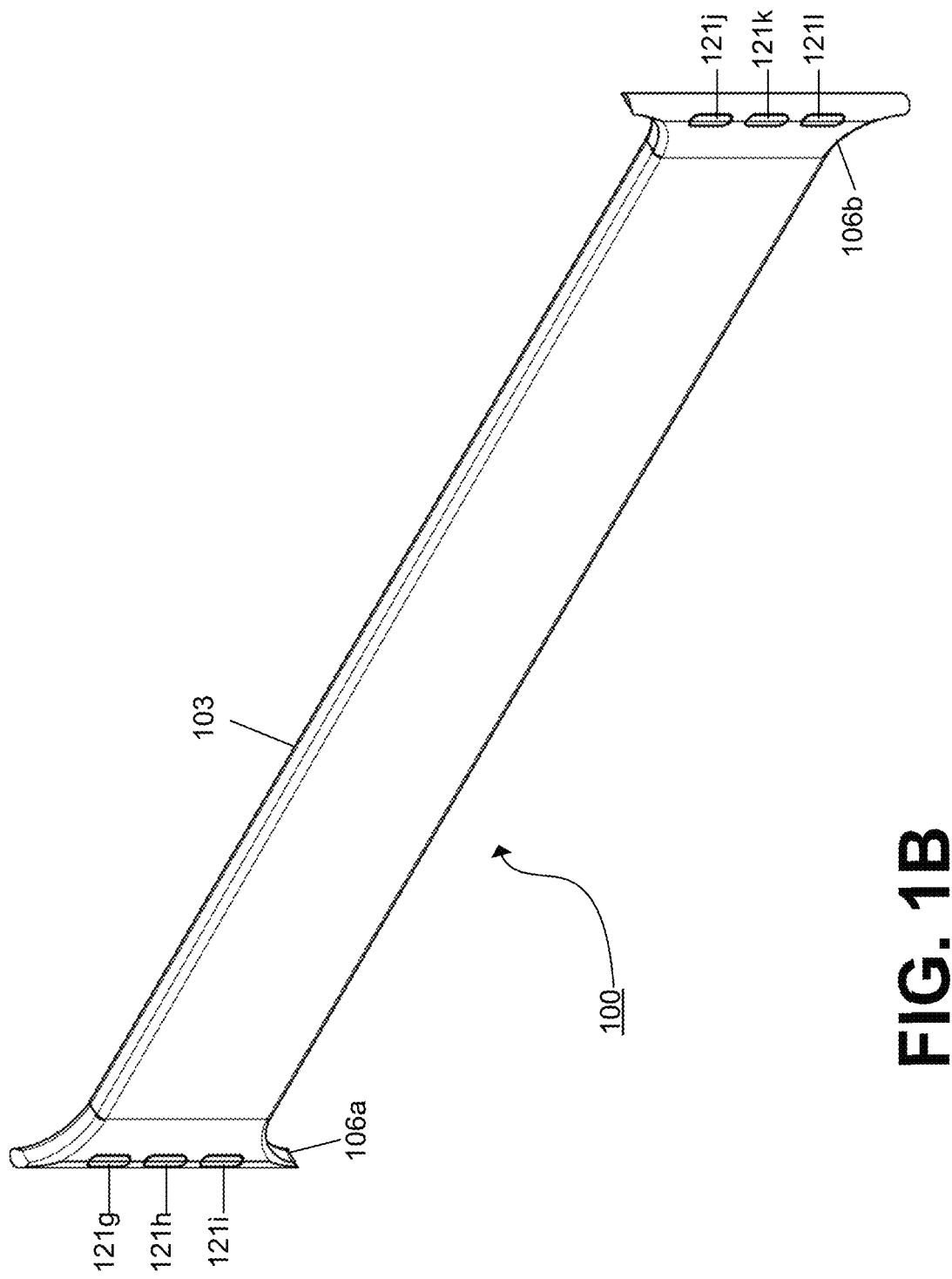
FIG. 1B depicts a perspective view for the second side of an RFID-enabled watch band according to various embodiments of the present disclosure.

FIG. 1B depicts a perspective view for the second side of an RFID-enabled watch band 100. FIG. 1B depicts the RFID-enabled watch band 100 including the band 103 and the watch connectors 106, as previously described. In some embodiments, the watch connectors 106 can have locking elements 121, such as locking elements 121g-l as shown in FIG. 1B. Locking elements 121g-l can be otherwise identical to the locking elements 121a-f, as previously described, but placed on the second side of the watch connectors 106.

FIG. 1C depicts a first side view of an RFID-enabled watch band according to various embodiments of the present disclosure. The band 103, the ends 112, the indent 115, the raised encasings 118, the connectors 106, the locking elements 121, and the RFID chips 109 are all previously described in the discussion for FIG. 1A.

FIG. 1D depicts a second side view of an RFID-enabled watch band according to various embodiments of the present disclosure. The band 103, the connectors 106, and the locking elements 121 are all previously described in the discussions for FIGS. 1A and 1B.

FIG. 1E depicts a medial right view of an RFID-enabled watch band, wherein the left side is the first side of the RFID-enabled watch band, according to various embodiments of the present disclosure. The band 103 and the connectors 106 are all previously described in the discussion for FIG. 1A.

FIG. 1F depicts a medial left view of an RFID-enabled watch band, wherein the right side is the first side of the RFID-enabled watch band, according to various embodiments of the present disclosure. The band 103 and the connectors 106 are all previously described in the discussion for FIG. 1A.

FIG. 1G depicts a lateral top view of an RFID-enabled watch band, wherein the top is the first side of the RFID-enabled watch band, according to various embodiments of the present disclosure. The connector 106 and the locking elements 121 are all previously described in the discussions for FIGS. 1A and 1B.

FIG. 1H depicts a lateral bottom view of an RFID-enabled watch band, wherein the top is the second side of the RFID-enabled watch band, according to various embodiments of the present disclosure. The connector 106 and the locking elements 121 are all previously described in the discussions for FIGS. 1A and 1B.

Figure 1I:
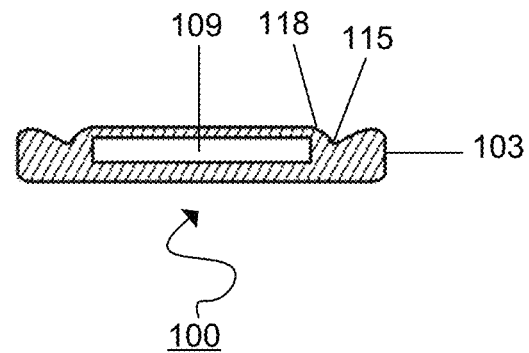
FIG. 1I depicts a cross sectional view of an RFID-enabled watch band according to various embodiments of the present disclosure.

FIG. 1I depicts a cross sectional view of an at least one embodiment of the RFID-enabled watch band 100 intersecting the band 103 and an RFID chip 109. In such an embodiment, the RFID chip 109 can be embedded in the band 103. The band 103 can completely encase, envelope, or cover the RFID chip 109, as previously discussed in the discussion of FIG. 1A. In some embodiments, the band 103 can have an indent 115 and a raised encasing 118, as previously discussed in the discussion of FIG. 1A. In such an embodiment, the raised encasing 118 can cover the RFID chip 109.

Figure 1J:
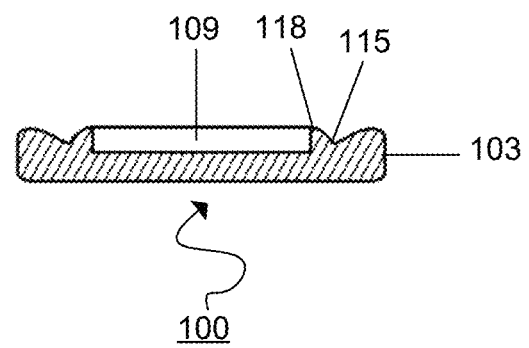
FIG. 1J depicts a second cross sectional view of an RFID-enabled watch band according to various embodiments of the present disclosure.

FIG. 1J depicts a cross sectional view of at least another embodiment of the RFID-enabled watch band 100 intersecting the band 103 and an RFID chip 109. In such an embodiment, the RFID chip 109 can be inset in the band 103 and can be at least partially exposed, as previously discussed in the discussion of FIG. 1A. In some embodiments, the band 103 can have an indent 115 and a raised encasing 118, as previously discussed in the discussion of FIG. 1A.

Figure 1K:
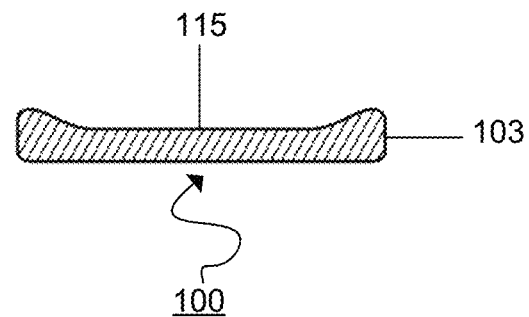
FIG. 1K depicts a third cross sectional view of an RFID-enabled watch band according to various embodiments of the present disclosure.

FIG. 1K depicts a cross sectional view of at least one embodiment of an RFID-enabled watch band 100 in the space between at least two RFID chips 109. In such embodiments, the band 103 can have an indent 115, as previously discussed in the discussion of FIG. 1A.

Figure 2A:
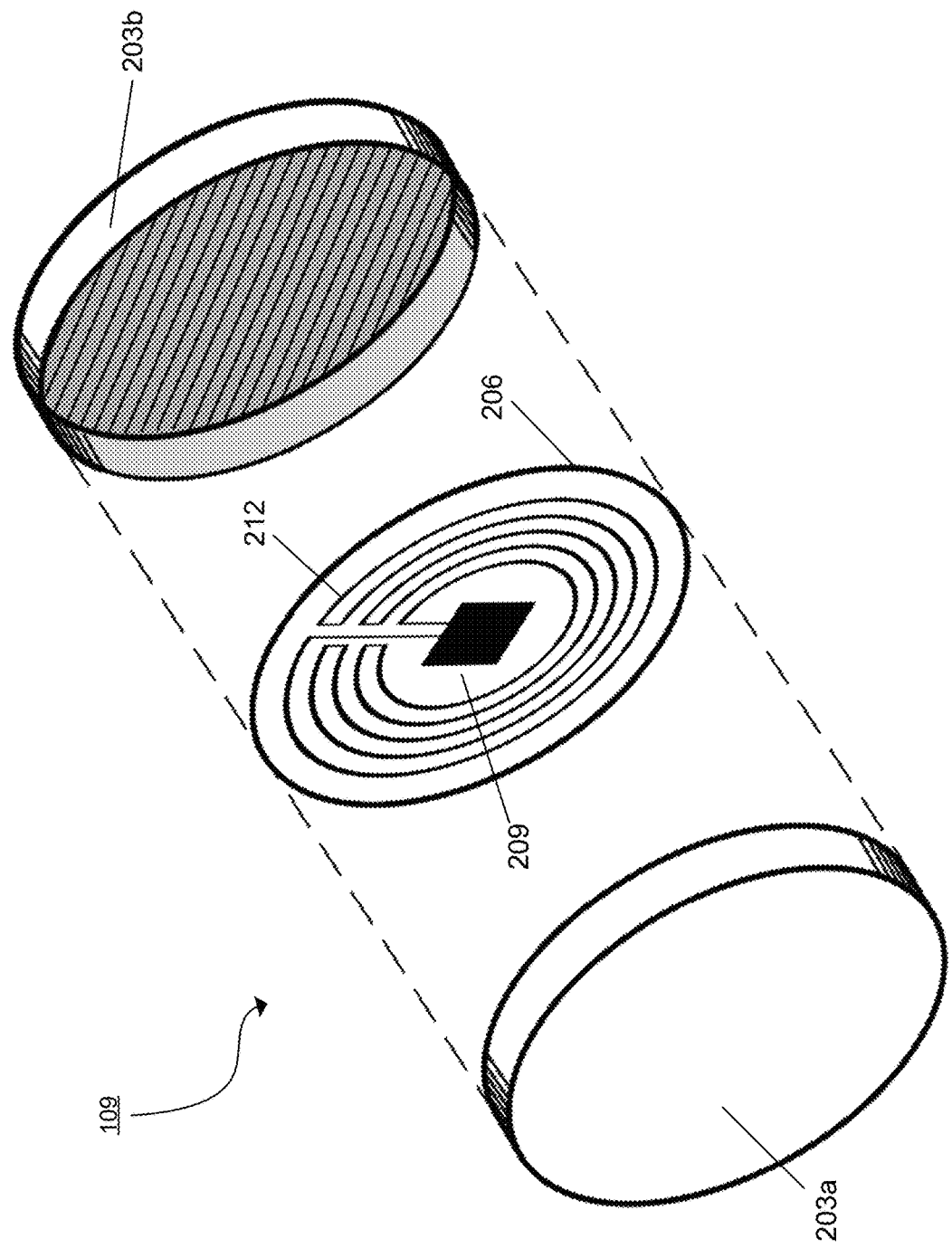
FIG. 2A depicts an exploded view of an RFID chip for the RFID-enabled watch band according to various embodiments of the present disclosure.

FIG. 2A depicts an exploded view of an RFID chip 109. In some embodiments, an RFID chip 109 can include a casing 203 (also called a substrate) and a transmitter 206. The casing 203 can be made of multiple parts, such as a front casing 203a and back casing 203b, as shown in FIG. 2A. The combination of the front casing 203a and the back casing 203b can collectively be called the casing 203. In some embodiments, there can only be a singular body that can be called the casing 203 which surrounds the transmitter 206. In some embodiments, there is no casing 203 at all. The casing 203 can protect the transmitter 206 from being damaged (e.g., impact damage, fire damage, water damage, wind damage, wear and tear, etc.). In some embodiments, the casing 203 can be made of a rigid material to better protect the transmitter 206. In other embodiments, the casing 203 can be made of materials that are flexible, semi-flexible, or elastic to provide comfort to the wearer.

In some embodiments, the transmitter 206 can include an integrated chip 209 and an antenna 212. The integrated chip 209 can be used to store information to be reflected or transmitted to an RFID reader. The antenna 212 can be used to amplify the radio frequency of the information stored on the integrated chip 209 to be reflected or transmitted to an RFID reader. Additionally, an RFID writer can send a signal to the transmitter 206 to store information on the integrated chip 209. If an RFID reader is moved near the transmitter 206, the antenna 212 can reflect or transmit the stored information from the integrated chip 209 to the RFID reader. In some embodiments, an RFID writer can re-send a signal to the transmitter 206 to overwrite the information on the integrated chip 209. In such embodiments, embedded RFID chips 109 or non-replaceable inset RFID chips 109 can modify their signal that is produced by the transmitter 206.

In some embodiments, an RFID chip 109 can also include a power source. For example, power sources can include a battery or a power connection to a watch or smart watch. Some RFID tags that include a power source can transmit information by the transmitter 206 without requiring an RFID reader to be nearby. When an RFID chip 109 of the RFID chips 109 includes a power source and the RFID chip 109 can transmit information without a nearby RFID reader, then the RFID chip 109 is considered an active RFID tag. Active RFID tags have various uses. One such use of active RFID tags is geolocation. In some embodiments, at least one of the RFID chips 109 is an active RFID tag that is capable of transmitting a signal to determine the geolocation of the RFID-enabled watch band 100.

When an RFID chip 109 does not include a battery power source or if it does not transmit information without intervention from an RFID reader, then the RFID chip 109 is a passive RFID tag. Passive RFID tags have various uses. One such use of passive RFID tags is access control (e.g., door keys, car keys, computer access cards, etc.). A passive RFID tag can be moved near an RFID reader and the RFID reader's systems will determine whether the information reflected from the passive RFID tag has permission to access something. In at least some embodiments, at least one of the RFID chips 109 is a passive RFID tag and it is used for access control. Another use for passive RFID tags is identification of personal information (e.g., work identification cards, passport, licenses, digital business card, vaccine passport, etc.). Passive RFID tags can be used to reflect information to a RFID reader to verify a person's identity or personal information. In at least some embodiments, at least one of the RFID chips 109 is a passive RFID tag and it is used for identification of personal information.

The RFID chips 109 can transmit or reflect information at various radio frequencies. Passive RFID tags typically reflect frequencies in three ranges: low frequencies, high frequencies, and ultra-high frequencies. Low frequency RFID chips can reflect frequencies between 30 KHz and 300 KHZ. Typically, low frequency RFID chips have a frequency of 125 HZ or 134.2 KHz (often abbreviated to 134 KHz). High frequency RFID chips can reflect frequencies between 3 MHz and 30 MHz. Typically, high frequency RFID chips can be near-field communication (NFC) chips, which have a frequency of 13.56 MHz. Ultra-high frequency RFID chips can reflect frequencies between 300 MHz to 1000 MHz. Active RFID tags can transmit at various frequencies, but many active RFID tags transmit at 433 MHz, 2.45 GHz, or 5.6 GHz.

Each of the RFID chips 109 in the RFID-enabled watch band 100 can be a passive RFID tags (low frequency, high frequency, or ultra-high frequency) or active RFID tags. Each RFID chip 109 can be different from the other RFID chips 109 in the RFID-enabled watch band 100. In at least one embodiment, all the RFID chips 109 of the RFID-enabled watch band 100 can be active RFID tags. In at least one embodiment, one or more of the RFID chips 109 of the RFID-enabled watch band 100 can be an active RFID tag and one or more of the RFID chips 109 of the RFID-enabled watch band 100 can be passive RFID tags. In at least one embodiment, all the RFID chips 109 of the RFID-enabled watch band 100 can be low frequency RFID chips. In at least one embodiment, all the RFID chips 109 of the RFID-enabled watch band 100 can be high frequency RFID chips. In at least one embodiment, all the RFID chips 109 of the RFID-enabled watch band 100 can be ultra-high frequency RFID chips. In at least one embodiment, one or more of the RFID chips 109 of the RFID-enabled watch band 100 can be low frequency chips and one or more of the RFID chips 109 of the RFID-enabled watch band 100 can be high frequency chips. In at least one embodiment, one or more of the RFID chips 109 of the RFID-enabled watch band 100 can be low frequency chips and one or more of the RFID chips 109 of the RFID-enabled watch band 100 can be ultra-high frequency chips. In at least one embodiment, one or more of the RFID chips 109 of the RFID-enabled watch band 100 can be high frequency chips and one or more of the RFID chips 109 of the RFID-enabled watch band 100 can be ultra-high frequency chips. In at least one embodiment, one or more of the RFID chips 109 of the RFID-enabled watch band 100 can be low frequency chips, one or more of the RFID chips 109 of the RFID-enabled watch band 100 can be high frequency chips, and one or more of the RFID chips 109 of the RFID-enabled watch band 100 can be ultra-high frequency chips.

In some embodiments, an RFID chip 109 can be a multi-frequency chip (also called a "multi-frequency RFID chip 109"). Multi-frequency RFID chips can store and transmit information on two or more frequencies. In some embodiments, an RFID chip that is a multi-frequency chip can store and transmit information over both a low frequency and a high frequency. A multi-frequency RFID chip 109 can store different information for each respective frequency supported by the multi-frequency RFID chip 109. For example, a wearer can store building access information for a low frequency and store credit card information for a high frequency on a multi-frequency RFID chip 109. Multi-frequency RFID chips 109 can be more convenient for wearers because more information can be stored on a single RFID chip 109, thus limiting the required number of RFID chips 109 in a RFID-enabled watch band 100.

In some embodiments, the location of one or more RFID chips 109 on the band 103 can impact the overall usage of the RFID-enabled watch band 100. For instance, many mobile devices (e.g., phones, tablets, smart watches, etc.) are capable of reading NFC chips when the mobile device collides with the NFC chip. Collision creates problems for walking in a crowded area or bumping into someone in a crowded room. A person wearing the RFID-enabled watch band 100 can accidentally collide into another person's phone (capable of acting as a RFID reader) accidentally without realizing. To solve this problem, the second RFID chip 109b can be an NFC can be inset or embedded in the band 103 between the first RFID chip 109a and the third RFID chip 109c. By placing the second RFID chip 109b between the first RFID chip 109a and the third RFID chip 109c, the second RFID chip 109b is more likely to be worn near the anterior side of the wearer's wrist (as opposed to the watch face being worn on the posterior side of the wearer's wrist). The anterior side of the wearer's wrist is less likely collide with mobile devices and therefore transmission or reflection of data to a mobile device would have to be made intentionally. In at least one embodiment, the first RFID chip 109a can be inset or embedded in the band 103 near the first end 112a of the band 103 and the first RFID chip 109a can be any RFID chip 109 except an NFC chip; the third RFID chip 109c can be inset or embedded in the band 103 near the second end 112b of the band 103 and the third RFID chip 109c can be any RFID chip 109 except an NFC chip; and the second RFID chip 109b can be inset or embedded on the band 103 between the first RFID chip 109a and the second RFID chip 109b and the second RFID chip 109b can be an NFC chip.

Additionally, the location of one or more RFID chips 109a-c on the band 103 can interfere with the functionality of a smart watch. Some smart watches have the ability to transmit RFID information to RFID readers. For instance, the Apple® Watch can transmit an RFID signal to perform Apple® pay functionality. In such instances, the smart watch is moved near an RFID reader and the smart watch transmits or reflects the information to the RFID reader. RFID chips 109 that are too close to a smart watch that is transmitting information can cause difficulty for an RFID reader to determine which signal to read. In some embodiments, the RFID chips 109 are embedded or inset in the band 103 at least a quarter of an inch from the watch connectors 106.

Additionally, the location of the RFID chips 109 on the band 103 can impact the ability of a RFID writer to successfully to send a signal to only one of the RFID chips 109 on the RFID-enabled watch band 100 so information can be stored. It can be difficult to put two of the same or similar frequency RFID chips 109 in a close proximity to each other. The RFID chips 109 can be physically spaced a specified distance from each other, separating the RFID chips 109 that share the same or similar frequency. The exact amount of space varies based on specific frequencies (e.g., low, high, ultra-high, etc.) and the shape and size of the RFID chips 109.

Figure 2D:
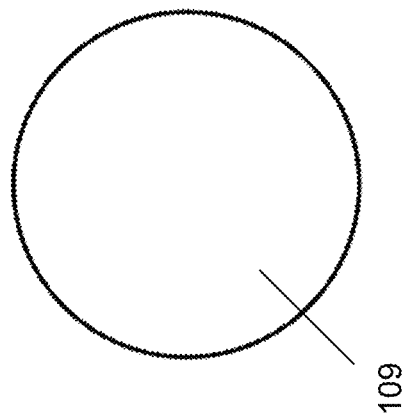
FIG. 2D depicts a side view of an RFID chip for the RFID-enabled watch band according to various embodiments of the present disclosure.
Figure 2C:
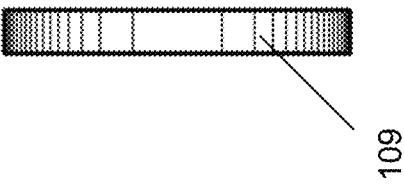
FIG. 2C depicts a medial view of an RFID chip for the RFID-enabled watch band according to various embodiments of the present disclosure.
Figure 2B:
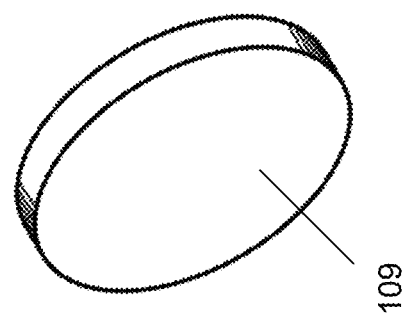
FIG. 2B depicts a perspective view of the first side of an RFID chip for the RFID-enabled watch band according to various embodiments of the present disclosure.

FIG. 2B depicts a perspective view of an RFID chip 109 for the RFID-enabled watch band 100 according to various embodiments of the present disclosure. The RFID chip 109 of FIG. 2B is fully described in the discussion of the RFID chip 109 of FIG. 2A.

FIG. 2C depicts a side view of an RFID chip 109 for the RFID-enabled watch band 100 according to various embodiments of the present disclosure. The RFID chip 109 of FIG. 2C is fully described in the discussion of the RFID chip 109 of FIG. 2A.

FIG. 2D depicts a front view and/or a back view of an RFID chip 109 for the RFID-enabled watch band 100 according to various embodiments of the present disclosure. The RFID chip 109 of FIG. 2C is fully described in the discussion of the RFID chip 109 of FIG. 2A.

FIGS. 3-12 are example images of a prototype of an RFID-enabled watch band 100 according to various embodiments of the present disclosure. FIG. 3 depicts a prototype of an RFID-enabled watch band 100 as worn on a wrist with a first side of the band 103 facing outward. FIG. 4 depicts another view of a prototype of an RFID-enabled watch band 100 as worn on a wrist with a first side of the band 103 facing outward. FIG. 5 depicts a prototype of an RFID-enabled watch band 100 as worn on a wrist with a second side of the band 103 facing outward. FIG. 5 also depicts the RFID-enabled watch band 100 as it is attached to a smart watch, such as an Apple Watch®. FIG. 7 depicts a prototype of an RFID-enabled watch band 100. FIG. 8 depicts a prototype of an RFID-enabled watch band 100 with focus on a watch connector 106. FIG. 9 depicts a prototype of an RFID-enabled watch band 100 with focus on the band 103. FIG. 10 depicts a prototype of an RFID-enabled watch band 100 being pulled from the ends 112. FIG. 11 depicts a prototype of an RFID-enabled watch band 100 being folded. FIG. 12 depicts a prototype of an RFID-enabled watch band 100 being connected to a smart watch by the watch connectors 106.

FIG. 2D depicts a medial right view of an RFID chip 109 for the RFID-enabled watch band 100 according to various embodiments of the present disclosure. The RFID chip 109 of FIG. 2D is fully described in the discussion of the RFID chip 109 of FIG. 2A

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X and/or Y; X and/or Z; Y and/or Z; X, Y and/or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, the following is claimed:

1. A band for a watch, comprising:
   an elongated body having a first end and a second end;
   a first connector attached at the first end of the elongated body, the first connector being attachable to a first portion of the watch;
   a second connector attached at the second end of the elongated body, the second connector being attachable to a second portion of the watch;
   a first casing embedded within the elongated body, the first casing encapsulating a first programmable radio frequency identifier (RFID) chip, the first RFID chip being programmed to a first radio frequency range; and
   a second casing embedded within the elongated body, the second casing encapsulating a second programmable RFID chip, the second RFID chip being programmed to a second radio frequency range, wherein the first radio frequency range and the second radio frequency ranges do not overlap.

2. The band of claim 1, further comprising:
   a third casing embedded within the elongated body, the third casing encapsulating a third programmable RFID chip, the third programmable RFID chip being programmed to the first radio frequency range; and
   wherein the first casing is embedded within the elongated body nearest to the first end of the elongated body, the third casing is embedded within the elongated body nearest to the second end of the elongated body, and the second casing is embedded within the elongated body between the first casing and the third casing.

3. An apparatus comprising:
   a strap body comprising a depressed portion, a first raised portion, and a second raised portion;
   a connector attached to an end of the strap body;
   a first radio frequency identifier (RFID) chip embedded within the first raise portion of the strap body; and
   a second RFID chip embedded within the second raised portion of the strap body.

4. The apparatus of claim 3, wherein the first RFID chip is embedded into the strap body at least a quarter inch from the connector.

5. The apparatus of claim 3, wherein the second RFID chip is embedded into the strap body at least half an inch from the first RFID chip and the second RFID chip is embedded at least three-quarters of one inch from the connector.

6. The apparatus of claim 3, wherein the connector is a first connector, the end of the strap body is a first end of the strap body, and wherein the apparatus further comprises:
   a third RFID chip embedded into the strap body; and
   a second connector attached to a second end of the strap body.

7. The apparatus of claim 6, wherein the first RFID chip is embedded into the strap body at least a quarter of an inch from the first connector, the third RFID chip is embedded at least one quarter of one inch from the second connector within the strap body, and the second RFID chip is embedded into the strap body between the first RFID chip and the third RFID chip.

8. The apparatus of claim 7, wherein the second RFID chip is a near-field communication (NFC) chip.

9. The apparatus of claim 3, wherein the first RFID chip is a low frequency RFID chip.

10. The apparatus of claim 3, wherein the strap body is made of a flexible material.

11. The apparatus of claim 3, wherein the first RFID chip comprises a rigid casing and a transmitter.

12. A radio frequency identifier (RFID) enabled watch band, comprising:
   a band comprising a first end, a second end, and two or more raised portions;
   two or more RFID chips inset within the two or more raised portions of the band;

a first watch connector attached at the first end of the band; and a second watch connector attached at the second end of the band.

13. The RFID enabled watch band of claim 12, wherein the two or more RFID chips are equidistantly inset within the two or more raised portions of the band.

14. The RFID enabled watch band of claim 12, wherein the first watch connector can be detachably attached to a watch.

15. The RFID enabled watch band of claim 12, wherein the band is made of a flexible material.

16. The RFID enabled watch band of claim 12, wherein at least one of the two or more RFID chips is a near-field communication (NFC) chip.

17. The RFID enabled watch band of claim 12, wherein at least one of the two or more RFID chips is a low frequency RFID chip.

18. The RFID enabled watch band of claim 12, wherein at least one of the two or more RFID chips comprise a rigid casing and a transmitter.

19. The RFID enabled watch band of claim 12, wherein the band further comprises an inward face and an outward face, and the two or more raised portions of the band are raised on the outward face of the band.

20. The RFID enabled watch band of claim 12, wherein at least one of the two or more RFID chips are multi-frequency RFID chips.

* * * * *